United States Patent [19]
Diduck

[11] Patent Number: 5,809,980
[45] Date of Patent: Sep. 22, 1998

[54] HEAT EXCHANGER AND FUEL PREHEATER

[75] Inventor: Victor J. Diduck, Kelowna, Canada

[73] Assignee: F.E.S. Innovations Inc., Canada

[21] Appl. No.: 927,108

[22] Filed: Aug. 29, 1997

[51] Int. Cl.[6] .................................................. F02M 33/00
[52] U.S. Cl. ............................................................. 123/549
[58] Field of Search ................................... 123/549, 557; 165/41, 51

[56] References Cited

U.S. PATENT DOCUMENTS

| | | | |
|---|---|---|---|
| 1,278,880 | 9/1918 | De Orlow | 123/549 |
| 1,825,830 | 9/1931 | Sullivan | 123/549 |
| 3,817,233 | 6/1974 | Kihn | 123/549 |
| 4,745,741 | 5/1988 | Houtman | 123/549 |
| 5,025,131 | 6/1991 | Van Konyenburg et al. | 123/549 |
| 5,218,944 | 6/1993 | Leonard . | |
| 5,443,053 | 8/1995 | Johnson . | |

FOREIGN PATENT DOCUMENTS

| | | |
|---|---|---|
| 960534 | 1/1975 | Canada . |
| 1015234 | 8/1977 | Canada . |

*Primary Examiner*—Marguerite McMahon
*Attorney, Agent, or Firm*—Hall, Priddy & Myers

[57] ABSTRACT

An apparatus for heating a fuel comprising a block with a passageway, having an output and an input, for conducting fuel to be heated is disclosed. The block is composed of a heat conductive material. A heating element, embedded in the block, heats the block which conducts the heat to the fuel flowing through the passageway heating it to a predetermined temperature.

11 Claims, 2 Drawing Sheets

HEAT EXCHANGER AND FUEL PREHEATER

FIELD

The present invention relates to an apparatus for controlling the temperature of a fuel with a heat exchanger.

BACKGROUND

Hydrocarbon based fuels such as gasoline, kerosene, and diesel fuel, are more efficient if they are heated prior to combustion. The efficiency and engine performance is increased while the exhaust emissions are decreased as the temperature of the fuel is raised. In colder temperatures, the fuel has long chain hydrocarbons and waxes that form molecules that become progressively larger as temperature decreases until the fuel gels. Even if the fuel is flowing, the long chain hydrocarbons and waxes may be large resulting in limited atomization. Heating the fuel increases the vaporization of these molecules.

U.S. Pat. No. 5,443,053, issued to Johnson, discloses a fuel heater with a heat exchanger that employs an engine heated coolant fluid or an electric immersion heater as a source of heat. U.S. Pat. No. 5,218,944, issued to Leonard, discloses a fuel preheating system that also employs engine heated coolant fluid to preheat the fuel. The preheated fluid is then mixed with cooled or unheated fuel to produce the fuel temperature required for optimum performance. Canadian Patent No. 960,534, issued to Auk, discloses winding a copper fuel line around a portion of a copper coolant fluid line conducting coolant heated by the engine to preheat gasoline. Canadian Patent No. 1,025,234, issued to Leibowitz et al., discloses the use of a heat exchanger and heated coolant fluid to raise the temperature of the fuel.

Fuel heaters which use engine coolant as a heat source and comprise of a tube carrying fuel arranged around a chamber filled with the engine coolant are known to heat fuel to substantially varying temperatures. Accordingly, it is the object of the invention to provide an improved apparatus for preheating a fuel to an optimum temperature.

SUMMARY OF THE INVENTION

According to the invention, there is provided an apparatus for heating a fuel comprising a block of a heat conductive material. The block has a passageway with an input and an output that conducts fuel and a heating element, near the passageway, that heats the block. The block conducts heat to the fuel and heats it to a predetermined temperature.

The passageway may include a conduit of heat conductive material.

The block may be composed of potting epoxy in which metal filings are dispersed.

The apparatus may include a temperature sensor which senses the temperature of the fuel in the conduit at the output of the passageway. A control panel may be coupled to the temperature sensor and this control panel adjusts the current through the heating element when the temperature of the fuel falls below or exceeds a predetermined lower and upper limit, respectively.

When the fuel is gasoline, the upper and lower limits are such that the average temperature of the gasoline is 105° F.

There may be a casing around the block that decreases heat loss. This casing may have heat insulating material.

The heating element may be a 12V heating coil. The conduit may transport fuel at a flow rate of minimum of 4 gallons per hour.

BRIEF DESCRIPTION OF THE DRAWINGS

The novel features believed to characterize the invention are set forth in the appended claims. The invention, itself, however, as well as other features and advantages thereof, will be best understood by reference to the detailed description which follows, read in conjunction with the accompanying drawings, wherein:

DETAILED DESCRIPTION OF THE INVENTION

Figure 1:
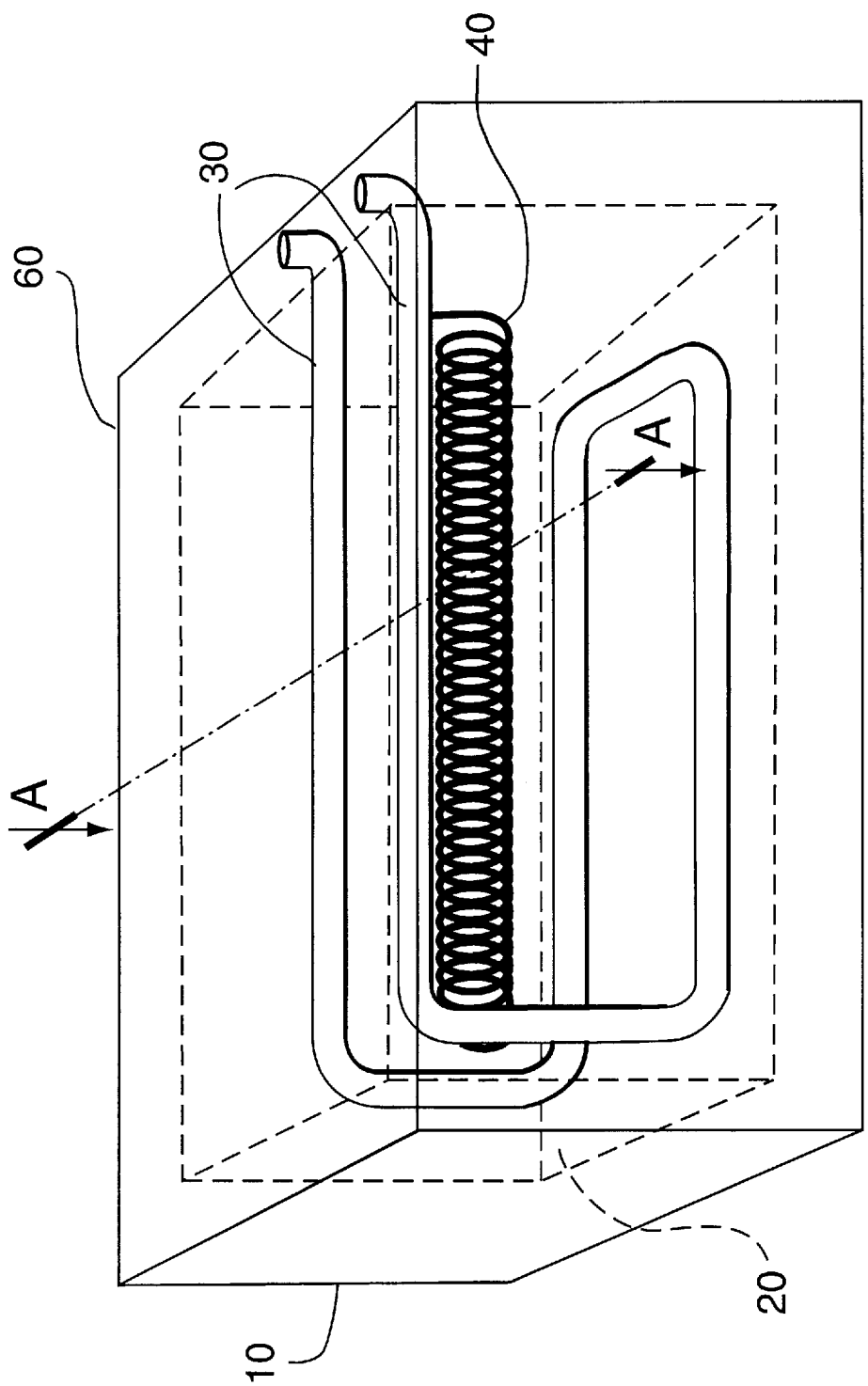
FIG. 1 is a perspective view of a heat-exchanger in accordance with a preferred embodiment of the invention.

Referring to FIG. 1, the heat exchanger 10 is comprised of a block 20 encasing a fuel conduit 30 that conducts the fuel that is to be heated. The fuel conduit 30 is composed of a heat conductive material, preferably copper. The block 20 is molded with potting epoxy with aluminum filings dispersed throughout. The aluminum filings provide a high thermal conductivity. A heating element 40 is also embedded in the block 20. The heating element 40 is insertable between the conduit 30 and is comprised of a 12 V direct current (DC) heating coil. The heating coil (manufactured by Delta Manufacturing, Tulsa, Okla.) is comprised of a metal wire covered by a heat conductive ceramic. Heating current is produced in the coil by a 12 V DC power supply 41. Heating element 40 serves to heat block 20 to a constant temperature of 105° F. The block 20 is surrounded by a casing 60 that prevents the heat from escaping into the environment. The casing 60 may also have heat insulating material.

Figure 2:
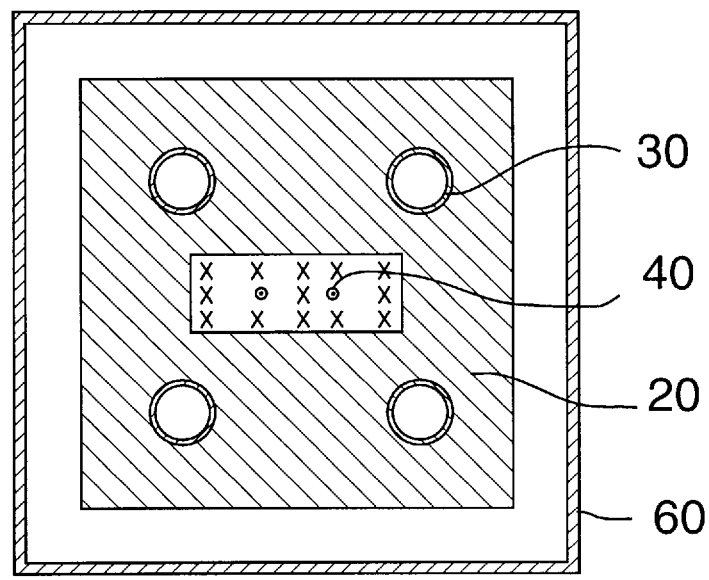
FIG. 2 is a cross-section along line A–A' of the heat-exchanger in FIG. 1.

Referring to FIG. 2, a cross-section along line 2–2' of FIG. 1 shows the conduit 30 and the heating coil 40 embedded in the block 20 and a casing 60 enclosing the block 20.

To assemble the heat exchanger 10, a heating element 40 and conduit 30 are positioned inside a mold. The potting epoxy is heated in a vacuum to 350° F. so that it is in a fluid state and is then mixed with aluminum filings so that the filings are uniformly dispersed throughout. Then the potting epoxy and aluminum mixture is poured into the mold and the mold is cooled. As the mold cools, the potting epoxy hardens around the heating element 40 and the conduit 30. Since the block 20 is in direct physical contact with the conduit 30 carrying the fuel to be heated, the rate of heat transfer from the block 20 to the fuel is high.

The configuration of the conduit 30 ensures that the maximum fuel supply through the conduit 30 is a minimum of 4 gallons/hr. The diameter of the conduit 30 is 0.5 inch and the total length of flow of the fuel is 31 inches. The block is 6 inches in length and 2 inches in each width and height.

Figure 3:
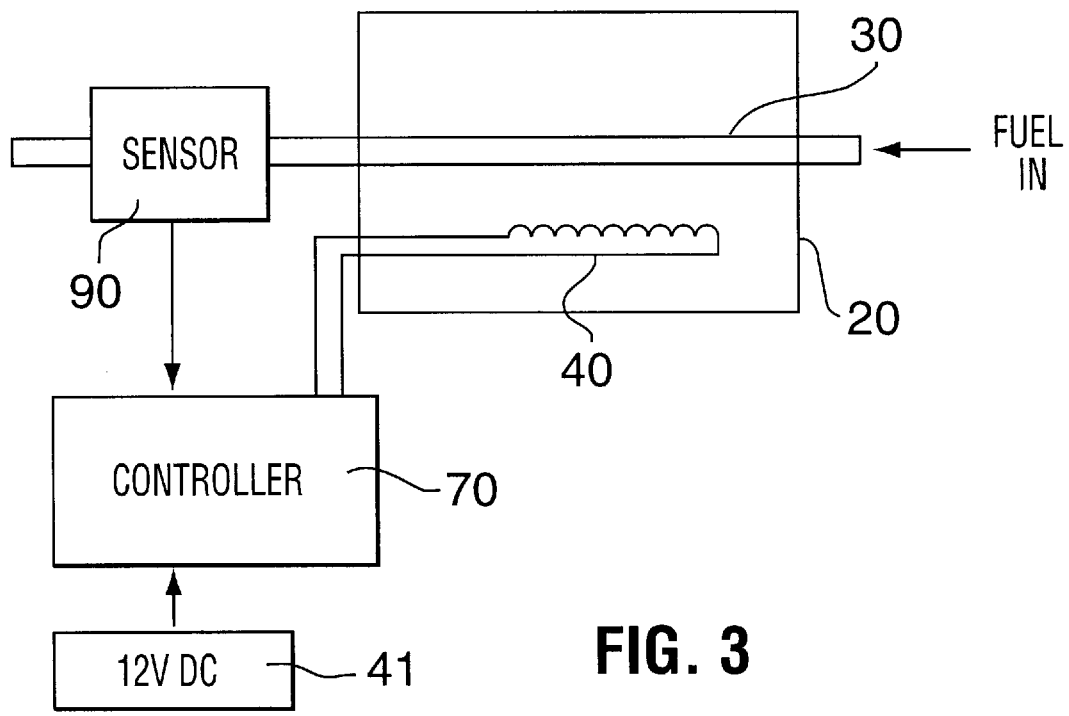
FIG. 3 is a schematic view of the heat exchanger and the control panel.

Referring to FIG. 3, a controller 70 coupled to a sensor 90 and the 12V DC heating coil 40 is present outside the block. The temperature of the exiting fuel is detected by the sensor 90 and the information is forwarded to the controller 70. The controller 70 compares the temperature to a user-defined preset maximum and minimum threshold and adjusts the current of the heating coil 40 to maintain the temperature of the fuel between the two thresholds. The sensor 90 is programmable and able to control the temperature in a range of +/−1° F.

The conduit 30 can be in any configuration provided that the flow rate through the conduit 30 allows the exchange of heat between the block 20 and the fuel so that the temperature of the fuel exiting the heat exchanger is 105° F. The flow rate of the fuel through the conduit 30 is dependent on the length and width of the conduit 30. For a given width of the conduit 30, increasing the length of the conduit 30 will result in an increase in resistance to the flow of the fuel resulting in too little fuel passing through the heat exchanger. Decreasing the length will result in the fuel passing through the conduit 30 without extracting sufficient heat to raise the temperature of the fuel to the required temperature.

The heating element 40 is a 12V DC heating coil that serves to heat the ceramic. However, with the appropriate changes in the configuration of the conduit, other methods of heating the block may be substituted.

The fuel is gasoline but with suitable dimensional modifications could be used for kerosene and diesel.

Preferably, the conduit is made of metal of high heat-conductivity, but the conduit could be eliminated and the passageway in the block itself used instead.

In operation, the fuel is heated by the conduction of heat from the block 20 which, in turn, is heated by the heating element 40. Fuel flows at a minimum of 4 gallons per hour through the conduit 30 and is heated as it flows through the conduit 30. The sensor 90 outside the block 20 determines the temperature of the fuel. If the temperature of the fuel is greater or lesser than a pre-set maximum and minimum threshold, respectively, the controller 70 adjusts the current flowing through the coil to maintain the fuel temperature between the thresholds at about 105° F.

While the present invention has been described with particularity, it should be understood that various modifications and alterations may be made therein without departing from the spirit and scope of the invention set forth in the appended claims.

What is claimed is:

1. An apparatus for heating a fuel comprising:

a) a block of a heat conductive material composed of potting epoxy with sufficiently dispersed metal filings;

b) a passageway in said block for conducting a fuel to be heated, having an input and an output; and, c) a heating element embedded in said block proximate to said passageway and operative to heat said block;

whereby said block, upon being heated by said heating element, conducts heat to heat fuel flowing along said passageway to a predetermined temperature.

2. Apparatus according to claim 1, wherein including a conduit, in said passageway, composed of a heat conductive material.

3. Apparatus according to claim 2, wherein said conduit is composed of copper.

4. Apparatus according to claim 2, including a temperature sensor operative to sense the temperature of fuel in said conduit at the output of said passageway.

5. Apparatus according to claim 4, including a control panel coupled to the temperature sensor and operative to adjust a current through said heating element when the temperature of fuel falls below and exceeds predetermined lower and upper temperature thresholds, respectively.

6. Apparatus according to claim 5, wherein the fuel is gasoline.

7. Apparatus according to claim 6, wherein the upper and lower threshold are such that temperature of gasoline at the output is at an average temperature of 105° F.

8. Apparatus according to claim 2, including a casing encasing said block, said casing operative to decrease heat loss.

9. Apparatus according to claim 8, wherein said casing includes a heat insulating material.

10. Apparatus according to claim 2, wherein said heating element is a 12V direct current heating coil.

11. Apparatus according to claim 2, wherein said conduit transports fuel at a flow rate of a minimum of 4 gallons per hour.

* * * * *

UNITED STATES PATENT AND TRADEMARK OFFICE
CERTIFICATE OF CORRECTION

PATENT NO.   : 5,809,980
DATED        : 09/22/98
INVENTOR(S)  : Victor J. Diduck It is certified that error appears in the above-identified patent and that said Letters Patent is hereby corrected as shown below:

Column 1, line 32, change "1,025,234" to --1,015,234--.

Signed and Sealed this

Eleventh Day of May, 1999

Attest:

Q. TODD DICKINSON

Attesting Officer

Acting Commissioner of Patents and Trademarks